(12) United States Patent
McTighe

(10) Patent No.: US 9,534,973 B2
(45) Date of Patent: Jan. 3, 2017

(54) CAPACITIVE STATIC AND DYNAMIC SENSOR

(71) Applicant: ROSEMOUNT AEROSPACE, INC., Burnsville, MN (US)

(72) Inventor: James Joseph McTighe, Burnsville, MN (US)

(73) Assignee: ROSEMOUNT AEROSPACE, INC., Burnsville, MN (US)

( * ) Notice: Subject to any disclaimer, the term of this patent is extended or adjusted under 35 U.S.C. 154(b) by 490 days.

(21) Appl. No.: 14/242,343

(22) Filed: Apr. 1, 2014

(65) Prior Publication Data

US 2015/0276530 A1 Oct. 1, 2015

(51) Int. Cl.
*G01L 9/12* (2006.01)
*G01L 9/00* (2006.01)
*G01L 19/08* (2006.01)

(52) U.S. Cl.
CPC .............. *G01L 9/0072* (2013.01); *G01L 9/12* (2013.01); *G01L 19/083* (2013.01)

(58) Field of Classification Search
CPC ...... G01L 9/0075; G01L 9/0072; G01L 9/008; G01L 7/00
USPC ........................... 73/724, 718, 723, 715, 700
See application file for complete search history.

(56) References Cited

U.S. PATENT DOCUMENTS 3,939,468 A * 2/1976 Mastin ...................... G01S 1/72
330/7

5,085,070 A * 2/1992 Miller ..................... B82Y 35/00
73/105
6,509,746 B1 * 1/2003 Wang ....................... G01D 5/24
324/678

FOREIGN PATENT DOCUMENTS

WO 2009130626 10/2009

OTHER PUBLICATIONS

Extended European Search Report dated Jul. 9, 2015 in European Application No. 15161744.6.
Guo, et al., "A Monolithically Integrated Surface Micromachined Touch Mode Capacitive Pressure Sensor," Sensors and Actuators 80, 2000, pp. 224-232.

* cited by examiner

*Primary Examiner* — Lisa Caputo
*Assistant Examiner* — Nigel Plumb
(74) *Attorney, Agent, or Firm* — Snell & Wilmer LLP

(57) ABSTRACT

A capacitive pressure sensor may be configured to transduce both a dynamic pressure and a static pressure using a single diaphragm. A capacitive pressure sensor may comprise a dynamic excitation signal module in parallel with a static excitation signal module, a summing amplifier module in connection with both the dynamic excitation module and the static excitation module, a dynamic charge amplifier stage in a parallel with a static charge amplifier stage, and a capacitive sensor connected to an output of the summing amplifier module, as well as an input of the dynamic charge amplifier stage, and an input of the static charge amplifier stage. Further, a dynamic excitation signal may be provided by the dynamic excitation signal module as a constant DC voltage signal, and a static excitation signal may be provided by the static excitation signal module as an AC voltage signal.

18 Claims, 2 Drawing Sheets

CAPACITIVE STATIC AND DYNAMIC SENSOR

FIELD

Figure 1A:
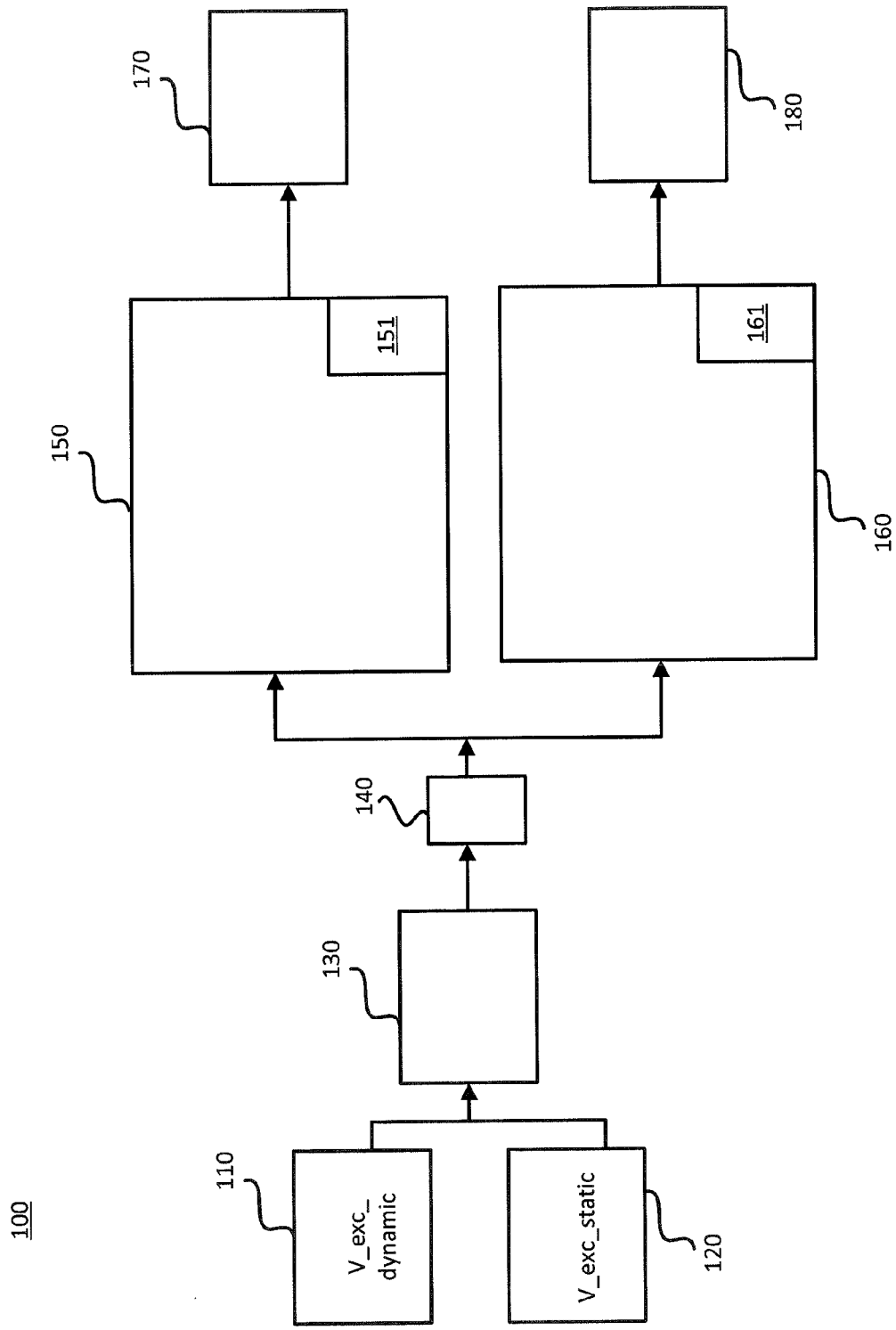

The present disclosure relates to a capacitive pressure sensor, and more specifically, to determining both a static and dynamic pressure using a capacitive pressure sensor with a single diaphragm.

BACKGROUND

Generally, a capacitive pressure sensor is designed to measure either a dynamic pressure or static pressure. For applications measuring both dynamic and static pressure, two separate pressure sensors are typically used. Using two pressure sensors results in having two electronic packages, two sensors, and two times the connections, and the extra associated space to install the separate pressure sensors.

SUMMARY

In accordance with various embodiments, a capacitive pressure sensor may be configured to transduce both a dynamic pressure and a static pressure using a single diaphragm. A capacitive pressure sensor may comprise a dynamic excitation signal module in parallel with a static excitation signal module, a summing amplifier module in connection with both the dynamic excitation module and the static excitation module, a dynamic charge amplifier stage in a parallel with a static charge amplifier stage, and a capacitive sensor connected to an output of the summing amplifier module. The capacitive sensor may be connected to an input of the dynamic charge amplifier stage, and the capacitive sensor may be connected to an input of the static charge amplifier stage. A dynamic excitation signal may be provided by the dynamic excitation signal module as a constant DC voltage signal; and a static excitation signal may be provided by the static excitation signal module as an AC voltage signal. Furthermore, the capacitive pressure sensor may comprise a filter configured for the dynamic pressure signal path configured to receive an output of the dynamic charge amplifier stage, and a filter configured for the static pressure signal path configured to receive an output of the static charge amplifier stage.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

Figure 1B:
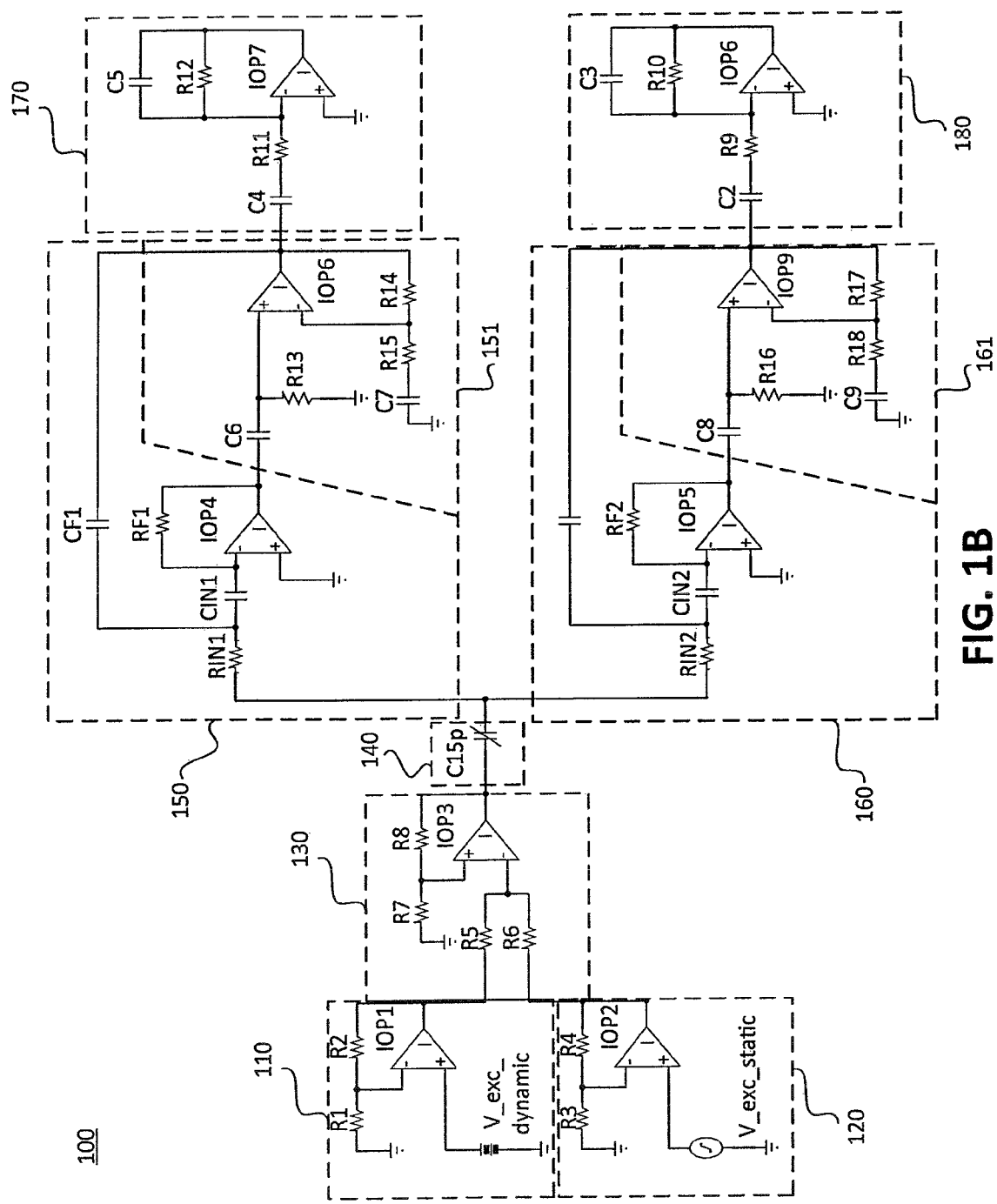

FIG. 1A illustrates a block diagram of an exemplary capacitive pressure sensor, in accordance with various embodiments; and FIG. 1B illustrates a schematic diagram of an exemplary capacitive pressure sensor, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, electrical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, coupled or the like may include permanent, removable, temporary, partial, full and/or any other possible attachment option. Additionally, any reference to without contact (or similar phrases) may also include reduced contact or minimal contact.

In accordance with various embodiments, a capacitive pressure sensor may comprise a single diaphragm to transduce both the static and dynamic pressure. The single diaphragm may be a Micro Electro-Mechanical System (MEMS) diaphragm. Further, in various embodiments and with reference to FIG. 1A, an exemplary capacitive pressure sensor 100 may comprise a dynamic excitation signal module 110 in parallel with a static excitation signal module 120, each connected to a summing amplifier module 130. The summing amplifier module 130 may be connected to a capacitive sensor 140, which in turn may be connected to an input of a dynamic charge amplifier stage 150 and, in parallel, an input of a static charge amplifier stage 160, respectively. Moreover, in various embodiments, an output of the dynamic charge amplifier stage 150 may be connected to a filter 170 configured for the dynamic pressure signal path. Similarly, an output of the static charge amplifier stage 160 may be connected to a filter 180 for the static pressure signal path. FIG. 1B illustrates a potential schematic layout, in accordance with various embodiments, of capacitive pressure sensor 100, various components of which may be referenced in the description of the design and operation of the capacitive pressure sensor.

Capacitive pressure sensor 100 may be configured to transduce both the dynamic pressure and static pressure using a single diaphragm and sensor electronics. A static signal path may be initiated with the static excitation signal, V_exc_static, and a dynamic signal path may be initiated with the dynamic excitation signal, V_exc_dynamic. The two excitation voltages may be separately increased by the gain amplifiers and then provided to the summing amplifier module 130. For example, the dynamic excitation signal module 110 may be configured to provide V_exc_dynamic to the summing amplifier module 130. V_exc_dynamic may be a constant DC voltage signal. In various embodiments, the dynamic excitation signal module 110 may comprise a non-inverting amplifier having an op-amp, which may be configured to amplify V_exc_dynamic. V_exc_dynamic may be provided to the positive terminal of the op-amp of the dynamic excitation signal module 110. A V_exc_dynamic output signal may be communicated to the summing amplifier module 130.

Similarly, the static excitation signal module 120 may also be configured to provide V_exc_static to the summing amplifier module 130. V_exc_static may be an AC voltage signal. In various embodiments, the static excitation signal module 120 may also comprise a non-inverting amplifier having an op-amp, which may be configured to amplify V_exc_static. V_exc_static may be provided to the positive terminal of the op-amp of the static excitation signal module 120. A V_exc_static output signal may be communicated to the summing amplifier module 130.

In addition, the dynamic excitation signal module 110 and the static excitation signal module 120 may be responsive over different bandwidths, and input signals outside of these ranges may be attenuated. For example, the static excitation signal may be responsive to an input signal in the range of about 100 kHz to 1 MHz. The dynamic excitation signal may be responsive to an input signal in the range of about 0.1 Hz to 50 kHz.

Summing amplifier module 130 combines the V_exc_dynamic output signal and the V_exc_static output signal to generate a combined excitation signal, which is provided to, and drives, the capacitive sensor 140. Moreover, V_exc_dynamic output signal portion of the combined excitation signal creates a DC bias across the capacitive sensor 140. In various embodiments, the current output of the capacitive sensor 140 is converted into a voltage by the dynamic charge amplifier stage 150 and the static charge amplifier stage 160.

As shown in FIGS. 1A and 1B, the dynamic charge amplifier stage 150 is in parallel with the input of the static charge amplifier stage 160. Both the dynamic charge amplifier stage 150 and the static charge amplifier stage 160 receive an output signal from the capacitive sensor 140. The charge amplifier stages 150, 160 convert the sensor output signal into a voltage, and separate the gain from the bandwidth. In various embodiments, charge amplifier stages 150, 160 transfers the sensor output signal to another reference capacitor and produces an output voltage equal to the voltage across the reference capacitor. Thus the output voltage is proportional to the charge of the reference capacitor and, respectively, to the input charge; hence the circuit acts as a charge-to-voltage converter. The charge amplifier stages 150, 160 each separate the frequency response from the transimpedance gain. In response to the static and dynamic system parameters being separated by the dynamic charge amplifier stage 150 and the static charge amplifier stage 160, the static pressure signal path has a different transimpedance gain than the dynamic pressure signal path. The gain may be optimized for both the static pressure signal path and the dynamic pressure signal path, resulting in an improved signal-to-noise ratio (SNR).

In accordance with various embodiments and as illustrated in FIG. 1B, the dynamic charge amplifier stage 150 may be a second order charge amplifier and the static charge amplifier stage 160 may also be a second order charge amplifier. The frequency response of a second order charge amplifier is similar to a band pass filter, enabling a reduction in the crosstalk between the static pressure signal path and the dynamic pressure signal path. Further, the band pass filters 170, 180 that may follow the charge amplifier stages 150, 160, respectively, further attenuate any remaining crosstalk of the static and dynamic signals. In other embodiments, the charge amplifier stage 150 for the dynamic pressure signal path and the charge amplifier stage 160 for the static pressure signal path may each be first order charge amplifiers. Though the transimpedance gain cannot be set independent of the bandwidth in the first order charge amplifier as is possible in the second order charge amplifier, a first order charge amplifier may still be utilized in certain applications.

In various embodiments and with continued reference to FIGS. 1A and 1B, the dynamic charge amplifier stage 150 may further comprise an open loop boost amplifier 151. In accordance with various embodiments, the open loop amplifier may comprise one or more amplifiers. Similarly, in various embodiments, the static charge amplifier stage 160 may further comprise an open loop boost amplifier 161. The open loop boost amplifiers 151, 161 may help to mitigate effects due to a large input capacitance, such as a loss of bandwidth, an increase in non-linearity, and an increase in noise gain, which may occur in situations where there is a long cable between the capacitive sensor 140 and the charge amplifier stages 150, 160.

As previously mentioned, in accordance with various embodiments, the filter for the dynamic pressure signal path, such as filter 170, may be a band pass filter or a low pass filter. Further, in various embodiments, the filter for the static pressure signal path, such as filter 180, may be a band pass filter. Filter 180 may be any type of filter based the desired filtering. The band pass filter may be centered at the selected excitation signal operating frequency, and may facilitate further attenuation of the filtered signal. Additionally, in various embodiments, the output of the filter 180 for the static pressure signal path may be inputted into a demodulator and then through a low pass filter (both not shown) to remove the excitation frequency of V_exc_static.

Capacitive pressure sensor 100 as described herein may be beneficial in that by combining a static pressure signal and a dynamic pressure signal into a single diaphragm and associated electronics, it enables the reduction of a MEMS die, a MEMS package and header, and the connections for a separate extra sensor in comparison to having a separate dynamic pressure sensor and a separate static pressure sensor. Capacitive pressure sensor 100 may be used, for example, in applications where the sensor is about 10 feet or greater away from the electronics portion of the device. The reduction of connections may be beneficial at this length of separation distance, as the reduction in number of connections increases the separation between connections for a given volume, which correspondingly increase the impedance between connections, a desirable aspect between a capacitive sensor and the sensor electronics. In addition, capacitive pressure sensor 100 may produce increased SNR, in various embodiments, in comparison to a pressure sensor system having one diaphragm, one sensor excitation signal, and one charge amplifier. Moreover, the capacitive pressure sensor design disclosed herein may be used with any capacitive sensor that senses both statically and dynamically.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A capacitive pressure sensor comprising:
   a dynamic excitation signal module in parallel with a static excitation signal module;
   a summing amplifier module in connection with both the dynamic excitation signal module and the static excitation signal module;
   a dynamic charge amplifier stage in parallel with a static charge amplifier stage; and
   a capacitive sensor connected to an output of the summing amplifier module,
   wherein the capacitive sensor is connected to an input of the dynamic charge amplifier stage, and
   wherein the capacitive sensor is connected to an input of the static charge amplifier stage.

2. The capacitive pressure sensor of claim 1, further comprising a filter configured for the dynamic pressure signal path configured to receive an output of the dynamic charge amplifier stage, and a filter configures for the static pressure signal path configured to receive an output of the static charge amplifier stage.

3. The capacitive pressure sensor of claim 2, wherein the filter configured for the dynamic pressure signal path is at least one of a band pass filter or a low pass filter, and wherein the filter configured for the static pressure signal path is a band pass filter.

4. The capacitive pressure sensor of claim 3, wherein the band pass filter of the filter for the static pressure signal path is centered at a static excitation signal operating frequency, and wherein the band pass filter of the filter configured for the dynamic pressure signal path is centered at a dynamic excitation signal operating frequency.

5. The capacitive pressure sensor of claim 3, further comprising a demodulator and a low pass filter, wherein the demodulator receives an output from the filter configured for the static pressure signal path, and wherein the demodulator provides an input to the low pass filter, and wherein the demodulator and the low pass filter are configured to remove an excitation frequency of a static excitation signal.

6. The capacitive pressure sensor of claim 1, wherein the capacitive pressure sensor is configured to transduce both a dynamic pressure and a static pressure using a single diaphragm.

7. The capacitive pressure sensor of claim 1, wherein a dynamic excitation signal provided by the dynamic excitation signal module is a constant DC voltage signal; and wherein a static excitation signal provided by the static excitation signal module is an AC voltage signal.

8. The capacitive pressure sensor of claim 7, wherein the summing amplifier module combines the dynamic excitation signal and the static excitation signal to generate a combined excitation signal, and wherein the combined excitation signal is provided to the capacitive sensor.

9. The capacitive pressure sensor of claim 8, wherein a dynamic excitation signal portion of the combined excitation signal creates a DC bias across the capacitive sensor.

10. The capacitive pressure sensor of claim 1, wherein the dynamic excitation signal module and the static excitation signal module are responsive over different bandwidths.

11. The capacitive pressure sensor of claim 10, wherein a static excitation signal is responsive to an input signal in the range of about 100 kHz to 1 MHz; and wherein a dynamic excitation signal is responsive to an input signal in the range of about 0.1 Hz to 50 kHz.

12. The capacitive pressure sensor of claim 1, wherein the dynamic charge amplifier stage is a second order charge amplifier, and wherein the static charge amplifier stage is a second order charge amplifier.

13. The capacitive pressure sensor of claim 1, wherein the dynamic charge amplifier stage is a first order charge amplifier, and wherein the static charge amplifier stage is a first order charge amplifier.

14. The capacitive pressure sensor of claim 1, wherein the dynamic charge amplifier stage further comprises a dynamic open loop boost amplifier, and wherein the static charge amplifier stage further comprises a static open loop boost amplifier.

15. The capacitive pressure sensor of claim 1, further comprising a cable between the capacitive sensor and the dynamic charge amplifier stage and the static charge amplifier stage, wherein the cable is at least ten feet long.

16. A method comprising: determining, by a capacitive pressure sensor comprising a single diaphragm, a dynamic pressure and a static pressure, wherein the determining comprises: providing, by a dynamic excitation signal module, a dynamic excitation signal to a summing amplifier module; providing, by a static excitation signal module, a static excitation signal to the summing amplifier module; combining, by the summing amplifier module, the dynamic excitation signal and the static excitation signal to generate a combined excitation signal; and providing, by the summing amplifier module, the combined excitation signal to a capacitive sensor; wherein the capacitive sensor is responsive to both the static pressure and the dynamic pressure.

17. The method of claim 16, wherein the dynamic excitation signal provided by the dynamic excitation signal module is a constant DC voltage signal, and wherein the static excitation signal provided by the static excitation signal module is an AC voltage signal.

18. The method of claim 16, further comprising:
providing a current output of the capacitive sensor to both a dynamic charge amplifier stage and a static charge amplifier stage;
generating, by the dynamic charge amplifier stage, a dynamic pressure signal by converting the current output of the capacitive sensor to voltage and attenuating the static excitation signal; and
generating, by the static charge amplifier stage, a static pressure signal by converting the current output of the capacitive sensor to voltage and attenuating the dynamic excitation signal.

\* \* \* \* \*